United States Patent [19]

Seidl

[11] 4,174,671
[45] Nov. 20, 1979

[54] SEMISUBMERGED SHIP

[75] Inventor: Ludwig H. Seidl, Honolulu, Hi.

[73] Assignee: Pacific Marine & Supply Co., Ltd., Honolulu, Hi.

[21] Appl. No.: 907,122

[22] Filed: May 18, 1978

[51] Int. Cl.² .............................................. B63B 1/10
[52] U.S. Cl. ..................................... 114/61; 114/265
[58] Field of Search ...................... 114/61, 62, 56, 265, 114/256, 283, 49, 59, 312, 67 R; 244/105; 115/20, 22, 26; D12/62

[56] References Cited

U.S. PATENT DOCUMENTS 3,063,397  11/1962  Boericke, Jr. ................... 114/312 X

FOREIGN PATENT DOCUMENTS 1260831  1/1972  United Kingdom ...................... 114/61
1468764  3/1977  United Kingdom ...................... 114/61

*Primary Examiner*—Stephen G. Kunin
*Assistant Examiner*—Sherman D. Basinger
*Attorney, Agent, or Firm*—Limbach, Limbach & Sutton

[57] ABSTRACT

A marine vessel is provided which comprises a platform member, two parallel hulls disposed below the platform and adapted to be below the water surface when the ship is in operation, each of the hulls consists of an after section, a forward section having a smaller cross-sectional area than the after section and a central section having a cross-sectional area substantially smaller than that of the forward section and supported only by the junctions with the forward and after sections. Both forward sections and both after sections are joined to the platform member by strut-like members which are tapered so that their waterplane areas increase rapidly between the waterline and their junctions with the platform member.

5 Claims, 8 Drawing Figures

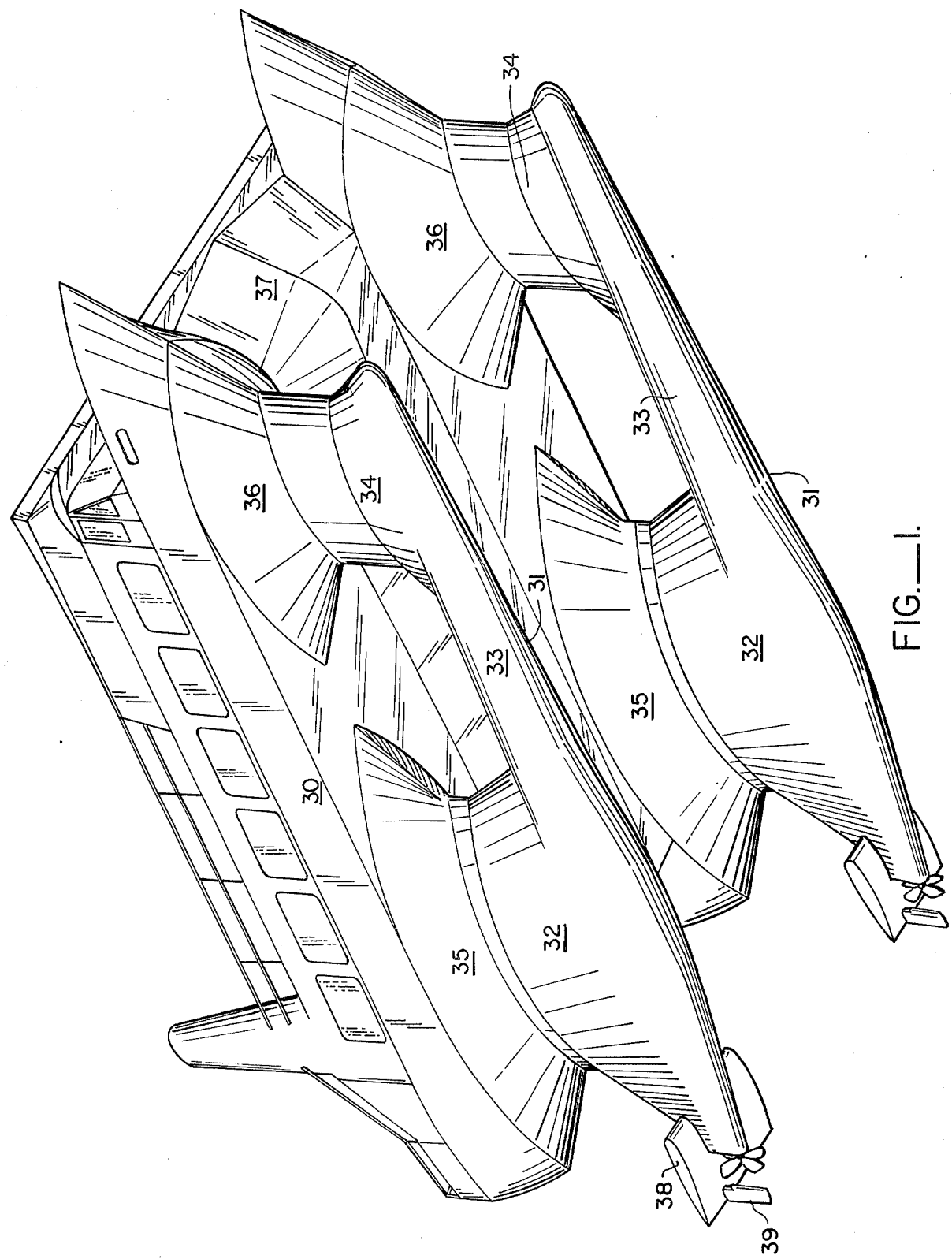
FIG._1.

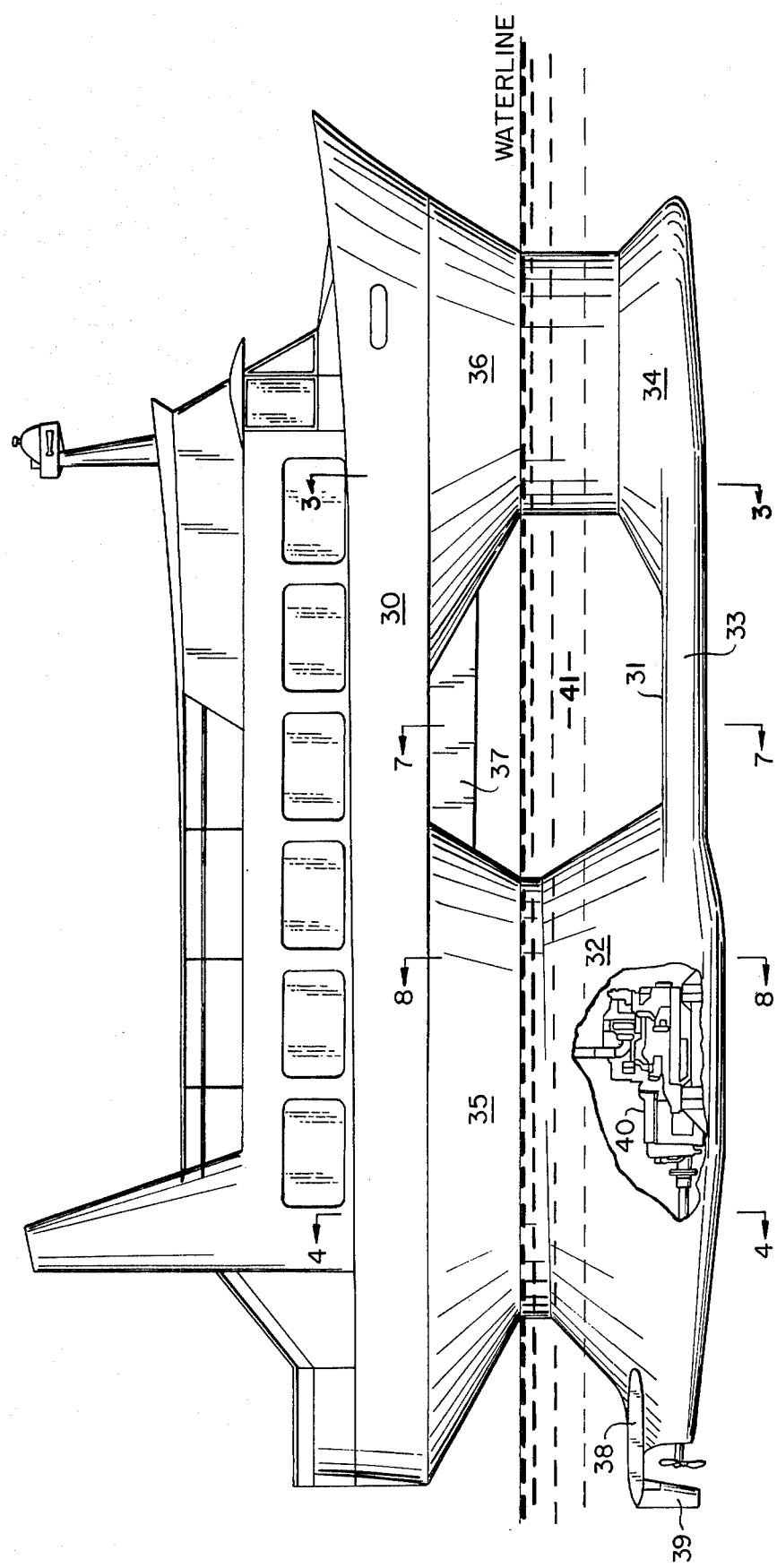

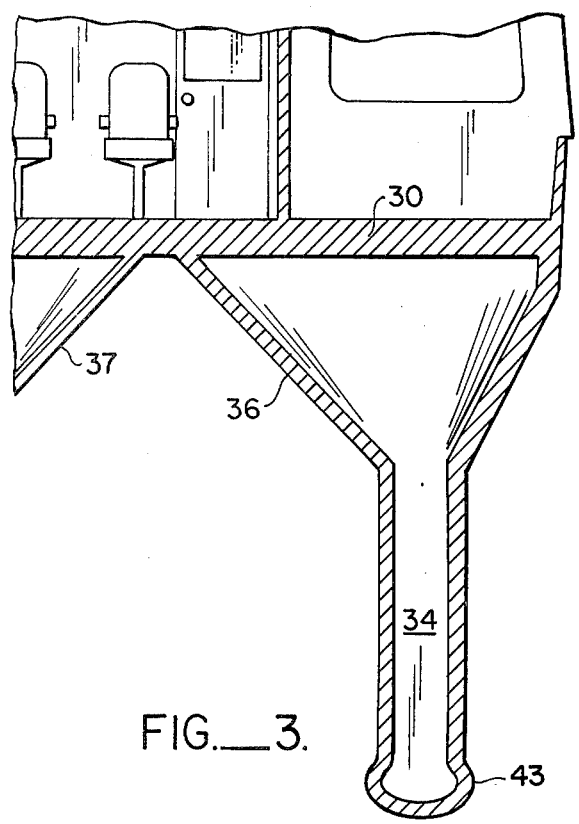
FIG._3.
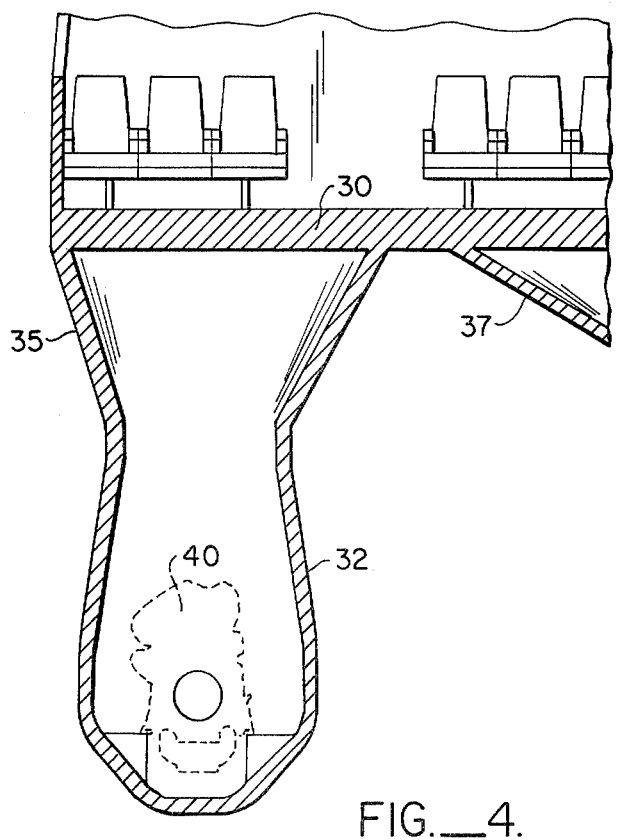
FIG._4.

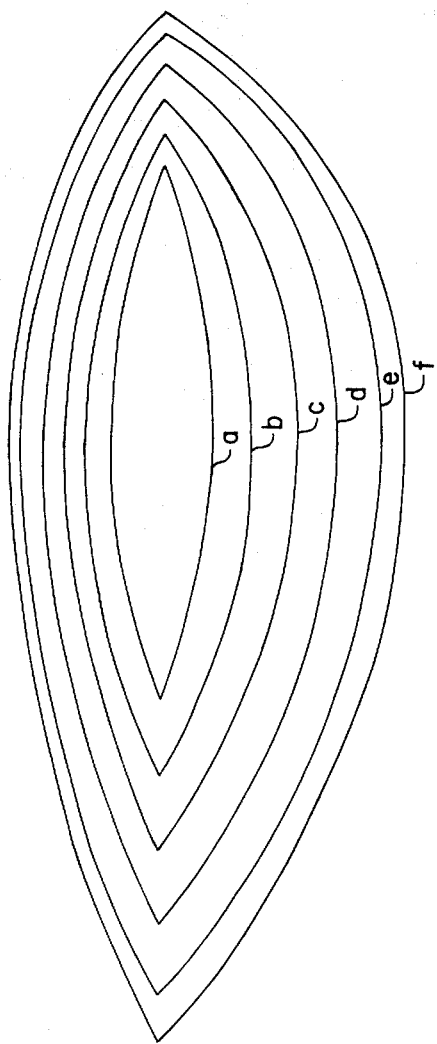
FIG._5.
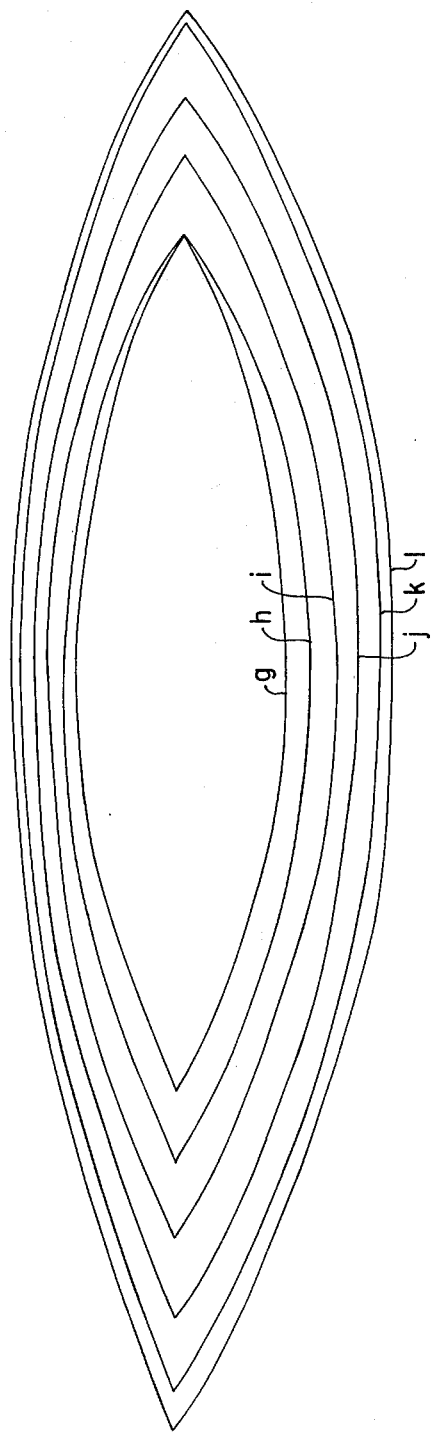
FIG._6.

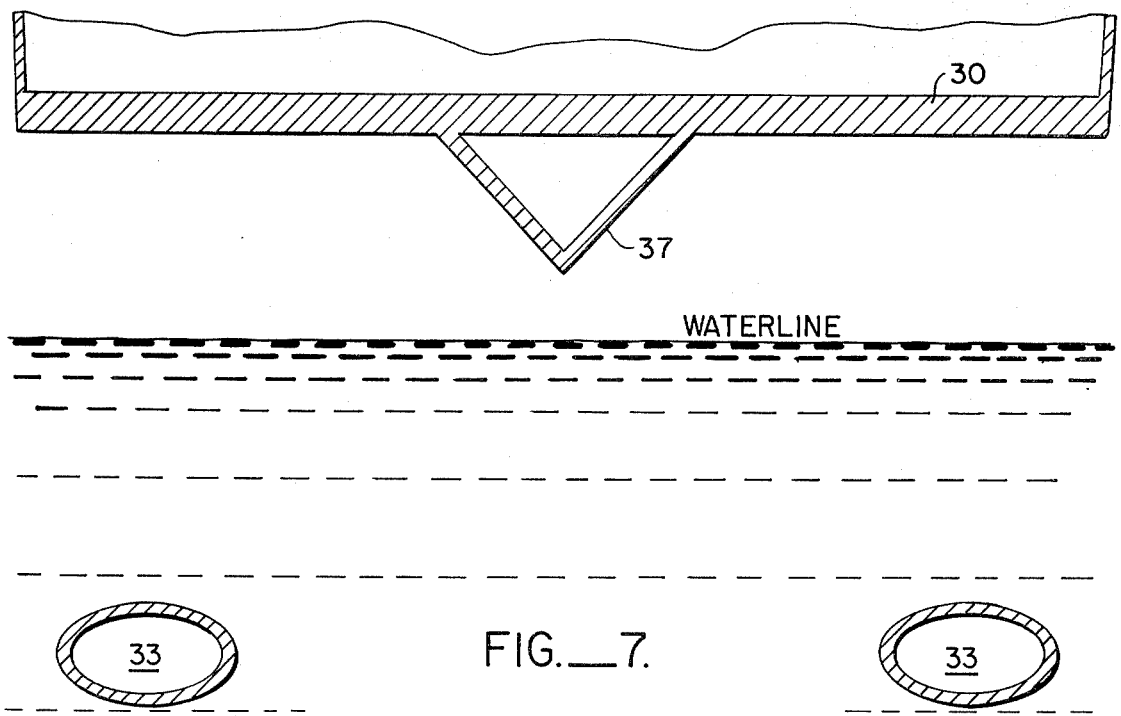
FIG._7.
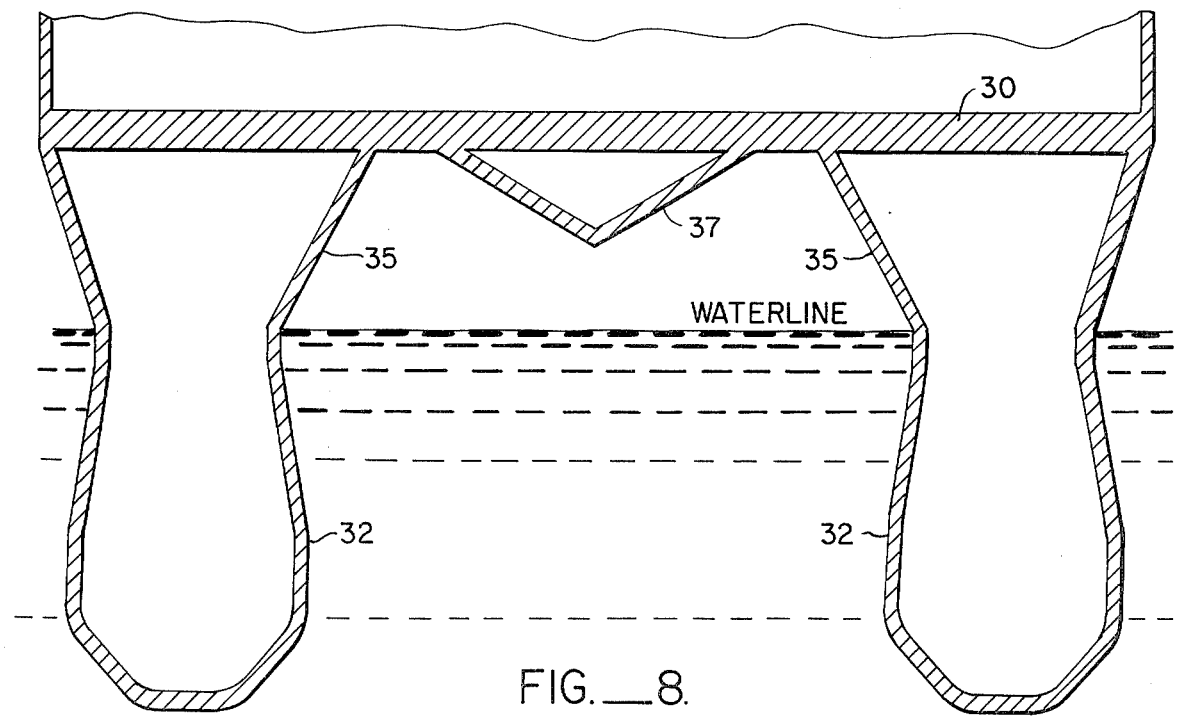
FIG._8.

SEMISUBMERGED SHIP

BACKGROUND OF THE INVENTION

The catamaran was probably the earliest twinhull vessel to appear. The catamaran consisted of a platform member having two hull members suspended from the platform, one on either side of the platform. The hulls are of uniform cross section and their sides were generally parallel planes.

Subsequently, small waterplane twin hull vessels were developed (sometimes referred to as SWATH ships) by the United States Navy. This type of vessel was a modification of the catamaran in which there were two submerged hulls of uniform cross section which were connected to the platform by elongated struts which have a cross section substantially smaller than the cross section of the submerged hull, hence the small waterplane twin hull characterization.

More recently, the Naval Ocean System Center at San Diego and Honolulu developed a design characterized as a "Two-strut" per side ship. These ships were characterized by submerged twin hulls of uniform cross section and the hulls were suspended from the platform by two narrow struts, one making a connection between the forward end of the submerged hull and the platform and the other making the connection between the after end of the submerged hull and the platform.

The design of the ship of the present invention employs the two-strut per side concept, but by the employment of submerged hulls which have varying cross sectional areas along the hull lengths and by employing strut-like connections between the submerged hulls and the platform which flare outwardly both longitudinally and transversely from the waterline to the junction with the platform, achieves improved stability, improved reduction of wave forces and the more effective use of applied horsepower.

BRIEF DESCRIPTION OF THE INVENTION

The ship of the present invention comprises a platform member, two parallel submerged hulls and two strut-like members connecting each submerged hull to the platform. The submerged hulls consist of an after section, a forward section having a substantially smaller cross sectional area than the cross sectional area of the after section, and a central section of flattened tubular form connecting the forward end of the after section with the after end of the forward section and supported only by the junctions of the central section with the forward and after sections. The forward and after sections of each hull are joined to the platform by strut-like members which flare outwardly both longitudinally and transversely from the waterline to the junction of the strut-like member with the platform. A third hull of triangular cross section is attached to the lower surface of the platform. This hull has a width about equal to the transverse distance to the narrowest transverse distance between the strut-like members which attach the hull to the platform and has a depth such that in normal operation of the ship in relatively calm seas, the third hull is not in contact with the water.

DETAILED DESCRIPTION OF THE INVENTION

In the appended drawings FIG. 1 is an isometric view of the ship;

FIG. 2 is a side view of the ship;

FIG. 3 is a cross-sectional view of the forward section of the port hull looking aft and taken along line 3—3;

FIG. 4 is a sectional view of the after section of the starboard hull looking aft and taken along line 4—4;

FIG. 5 is a series of horizontal sections of strut-like member 36 showing the cross-sectional areas from the waterline to the junction of the strut-like member with the platform;

FIG. 6 is a series of cross sections of strut-like member 35 showing the cross-sectional areas from the waterline to the junction with the platform;

FIG. 7 is a cross section of FIG. 2 taken along line 7—7.

FIG. 8 is a cross-section of FIG. 2 taken along line 8—8.

Referring now to FIG. 1 platform member 30 is the main deck of the vessel on which any desired superstructure may be erected. Two parallel submerged hulls 31 each consist of an after section 32, a forward section 34, and a central section 33. Strut-like members 35 join the after sections of the hulls to the platform. Strut-like members 36 join the forward sections of the hull to the platform. Narrow hydrofoils 38 are fitted into the after section of after hull member 32 and each supports a rudder 39. Triangular third hull 37 is suspended from the platform between the inner edges of the strut-like members. The bow of this third hull is slightly astern of the bow of the forward sections of the submerged hulls and its depth is preferably such that during operation of the vessel in calm seas the base of the third hull lies above the water surface.

Referring now to FIG. 2 of the appended drawings which is a side view of the ship, platform member 30 constitutes the main deck on which suitable superstructure may be erected. The submerged hull consists of after section 32, central section 33 and forward section 34. The cross-sectional area of after section 32 is substantially greater than that of forward section 34 which in turn is substantially greater than that of central section 33. Strut-like member 36 joins forward section 34 to platform 30. Above the waterline strut-like member 36 is outwardly flared both longitudinally and transversely so that the cross-sectional area of its junction with platform member 30 is substantially greater than that of its junction with forward hull section 34. Strut-like member 35 joins the after section of the submerged hull 32 with the platform and this strut-like member is also flared outwardly from the waterline to its junction with the platform so that the cross-sectional area of its junction with the platform is substantially greater than that of its junction with the after hull section.

Central section 33 of the hull is a flattened tubular form and has a cross-sectional area which is small relative either to the after or forward sections of the hull. Central section 33 of the hull is supported only by its junctions with after section 32 and forward section 34. Above central section 33 and between after section 32 and forward section 34 of the hull is a void space 41 which is filled with water to the waterline when the boat is in operation and through which water may pass freely transversely of the boat. In the upper portion of the void space 41, a portion of the third hull 37 is shown having its bottom above the waterline. Shown in cutaway in the after section of the hull is engine 40. An engine is mounted in each of the after sections of the twin hulls. Small hydrofoil 38 is mounted in the after portion of after hull section 32 and supports rudder 39. If desired hydrofoil 38 may be dispensed with and strut-like member 35 may be extended astern so that it contacts a vertical downward extension of platform 30 and the rudder may be mounted in the strut-like member so extended.

FIG. 3 is a cross-sectional view of forward hull member 34 and strut-like member 36 of the port side hull looking aft. Forward section 34 of the hull is generally rectangular in cross section, but has a bulb form base 43. Strut-like member 36 joins forward hull section 34 to platform 30. One side of the shallow third hull 37 is shown in midships position laterally.

FIG. 4 is a sectional view of the after section of the hull 32 and strut-like member 35 which joins the after section of the hull to platform 30 taken along line 4—4. The after section of the submerged hull 32 is pod-like in form and has a much greater cross-sectional area than does the forward section of the hull, being so sized that engine 40 shown in cutaway may be positioned in the after section of the hull.

FIG. 5 of the drawings shows a series of horizontal sections of strut-like member 36, section a being at the waterline and section f being the section at the junction of strut-like member 36 with platform 30. Sections b, c, d, and e are parallel horizontal sections taken at evenly spaced intervals between the waterline and the platform and show the substantial increase in the waterplane areas of strut-like member 36 between the waterline and the platform.

FIG. 6 shows a series of horizontal cross sections of strut-like member 35 between the waterline and the junction with platform 30. Section g is the section of strut-like member 35 at the waterline and section l is the section of strut-like member 35 at its junction with platform 30. Sections h, i, j, and k are equally spaced sections between the waterline and the platform and show the rapid increase of the waterplane areas of strut-like member 35, between the waterline and the platform.

FIG. 7 is a section of FIG. 2 taken along line 7—7. Triangular third hull 37 lies below platform 30 and has its base above the waterline. Sections of central hull section 33 lie below platform 30, but are not directly connected with it.

FIG. 8 is a section of FIG. 2 taken along line 8—8 and shows platform 30 and triangular third hull 37 lying below the platform and having its base above the waterline. After sections of the submerged hulls 32 are joined to the platform 30 by strut-like members 35.

The design of the submerged hull as shown and described above gives rise to a number of practical operating advantages. The after section of the submerged hull has a substantially greater cross-sectional area than the cross-sectional area of either the forward hull section or the central hull section. In a vessel having an overall length of about 65 feet, the diameter of the pod-shaped after section of the hull is ordinarily greater than 6 feet at its central portion. The design makes it possible for an engine to be disposed in each of the after sections of the two parallel submerged hulls. Disposing the engine in the hull permits the use of a conventional propulsion train and the weight of an engine so disposed lowers the center of gravity of the vessel. Positioning the engine in the after section of the submerged hull saves valuable deck area on the platform and provides maximum possible separation of the engines from passenger accommodations on the platform, thereby reducing engine noise and vibrations to a degree far beyond what might be achieved if the engines were mounted on the platform.

The forward section of the submerged hull is much smaller in cross section and in total volume than the after section. The smaller cross section of the forward section of the submerged hull tends to minimize the disturbance and wake created by it when traveling through the water, and, thus, adverse hydrodynamic interference between the forward section and the after section of the submerged hull is reduced. The weight distribution of the vessel having its engines mounted in the after section of the submerged hull permits the smaller sizing of the forward section since less buoyancy is required in the forward section.

The central section of the submerged hull is not directly joined to the platform and is supported solely by its junctions with the after section and forward section. The design of the central section leaves a void area 41 between the forward section and after section of each hull and this void area reduces overall heave force. The cross-sectional shape of the central section of the hull being of an oblong or horizontally flattened shape as shown in FIG. 7 tends to optimize the heave force reduction effect.

Strut-like members 35 and 36 join the after hull section and the forward hull section, respectively, to the platform. Both have waterplane areas, which increase significantly with vertical distance as shown in FIGS. 5 and 6. The rapid increase in the waterplane areas of the strut-like members above the waterline produces what may be characterized as a "hardening spring" effect in heave, roll and pitch conditions.

Third hull 37, which does not reach the water level under normal operating conditions provides additional longitudinal strength to the vessel and its deep V section reduces wave slap on the underside of the platform during operation in heavy seas. In the event that the lower hull should be partially or completely flooded, the third hull provides reserve buoyancy, which will keep the vessel afloat when the submerged hulls are in damaged condition.

While it is preferred that the third hull be clear of the water during normal operation in calm seas it may be extended downwardly to or below the water surface if desired.

As shown in FIG. 2, the forward transition zone of the after section of the submerged hull to the after strut-like member leads forward and achieves to a degree the effect of a bulbous bow, leading the strut-like member. The forward end of the forward section of the submerged hull is bulbed to produce a similar effect.

Horizontal bilge keels may be mounted on the submerged hulls and stabilizing fins or canards can provide further stabilization against both pitch and roll motions.

The submerged hulls are preferably constructed from mild steel and the platform and third hull from aluminum.

Overall, the design of the present vessel provides improved stability and safety and more efficient use of applied horsepower.

What is claimed is:

1. A marine vessel comprising:
   (a) a platform member;
   (b) two parallel hulls disposed below said platform and adapted to be below the water surface when the vessel is in operation;
   (c) each of said hulls comprising a pod shaped after section, a forward section having a generally rectangular cross section of substantially smaller cross-sectional area than the after section and a tubular central section, having a cross-sectional area substantially smaller than that of the forward section, joining the forward end of the after section to the after end of the forward section and supported only by the junctions with the forward and after sections;

(d) each after section being joined to said platform by a strut-like member;

(e) each forward section being joined to said platform by a strut-like member;

(f) all of said strut-like members being tapered so that their waterplane areas increase rapidly between the waterline and the junction of the strut-like member with the platform;

(g) the junctions of the strut-like members with the hull sections being so constructed that a portion of each connected hull section extends forward of the junction.

2. A marine vessel as defined in claim 1 having a third hull of triangular cross section attached to the lower surface of the platform, said triangular hull having a width approximately equal to the transverse distance between the strut-like members, having its bow slightly astern of the bow of the forward section of the first mentioned hulls.

3. A marine vessel as defined in claim 1 wherein an engine is mounted in the after section of each hull.

4. A marine vessel as defined in claim 1 wherein the cross-sectional area of each strut-like member is at a minimum approximately at waterline.

5. The marine vessel defined in claim 2 wherein the depth of the third hull is such that it lies above the water surface during operation of the vessel in calm seas.

* * * * *

UNITED STATES PATENT AND TRADEMARK OFFICE
CERTIFICATE OF CORRECTION

PATENT NO. : 4,174,671
DATED : November 20, 1979
INVENTOR(S) : Ludwig H. Seidl

It is certified that error appears in the above-identified patent and that said Letters Patent are hereby corrected as shown below:

On the title page designation of assignee should appear as follows:

Assignee: Pacific Marine Engineering Science Corp.
Honolulu, Hi.

Signed and Sealed this

Eighth Day of April 1980

[SEAL]

Attest:

SIDNEY A. DIAMOND

Attesting Officer

Commissioner of Patents and Trademarks